US008888341B2

(12) United States Patent
Endoh et al.

(10) Patent No.: US 8,888,341 B2
(45) Date of Patent: Nov. 18, 2014

(54) VEHICLE DOOR MIRROR

(75) Inventors: Tetsuya Endoh, Isehara (JP); Keisuke Honda, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 127 days.

(21) Appl. No.: 13/586,538

(22) Filed: Aug. 15, 2012

(65) Prior Publication Data

US 2013/0051047 A1    Feb. 28, 2013

(30) Foreign Application Priority Data

Aug. 31, 2011  (JP) ................................ 2011-188110
Aug. 31, 2011  (JP) ................................ 2011-188111

(51) Int. Cl.
*B60Q 1/26*    (2006.01)
*B60R 1/12*    (2006.01)
*B60R 1/06*    (2006.01)

(52) U.S. Cl.
CPC ................. *B60R 1/1207* (2013.01); *B60R 1/06* (2013.01)
USPC ....................................................... 362/494

(58) Field of Classification Search
CPC .... B60Q 1/1207; B60Q 1/2665; B60Q 3/023; B60R 1/025; B60R 2011/0033
USPC ....................................................... 362/494
See application file for complete search history.

(56) References Cited

U.S. PATENT DOCUMENTS

| 5,402,103 | A  | * | 3/1995 | Tashiro .......................... 340/475 |
| 6,994,621 | B2 | * | 2/2006 | Mashiko et al. .............. 454/270 |
| 7,510,311 | B2 | * | 3/2009 | Romas et al. ................. 362/494 |
| 8,041,209 | B2 |   | 10/2011 | Watanabe |
| 2010/0196000 | A1 |  | 8/2010 | Watanabe |

FOREIGN PATENT DOCUMENTS

| DE | 199 31 014 A1 | 11/2000 |
| DE | 199 51 178 A1 | 12/2000 |
| DE | 10 2009 052988 | 8/2010 |
| WO | WO 01/64462 A1 | 9/2001 |
| WO | WO 2007/005942 A2 | 1/2007 |
| WO | WO 2011/163376 A2 | 12/2011 |

* cited by examiner

*Primary Examiner* — Julie Bannan
(74) *Attorney, Agent, or Firm* — Foley & Lardner LLP

(57) ABSTRACT

In a vehicle door mirror, Between a circumferential edge of a mirror body 2 of a reflection mirror unit 1 in which a lighting unit 10 is incorporated and a flange on a circumferential edge 3a of a holder 3, a gap 4 for light emission is provided in a state in which the circumferential edges thereof are partially spaced from each other in a radial direction, and in the gap, a light emitting portion 10L of the lighting unit 10 is secondarily disposed. In this manner, a driver can directly visually recognize light that is emitted from the light emitting portion 10L, and a decrease in reflection area of the mirror body 2, which is caused by forming the gap 4, can be restrained to its required minimum level, making it possible to ensure an effective field of view of the door mirror.

7 Claims, 3 Drawing Sheets

VEHICLE DOOR MIRROR

CROSS-REFERENCE TO RELATED APPLICATIONS

This application claims priority of Japanese Patent Application No. 2011-188110 and Japanese Patent Application No. 2011-188111 filed on Aug. 31, 2011. The contents of these applications are incorporated herein by reference in their entirety.

BACKGROUND OF THE INVENTION

1. Field of the Invention

The present invention relates to a vehicle door mirror.

2. Description of the Related Art

Among vehicle door mirrors, for example, as disclosed in U.S. Pat. No. 7,510,311, it has been known that a vehicle door mirror is provided in such a manner that an opening window portion is partially formed at an inner circumferential edge of a flange on a circumferential edge of a holder that is adapted to hold a mirror body of a reflection mirror unit, and at the opening window portion, a light emission surface of a light guide such as an indicator incorporated in a back side of the mirror body is secondarily disposed.

In a technique disclosed in U.S. Pat. No. 7,510,311, light that is emitted from a light source is radiated from the light emission surface of the light guide that is disposed laterally of a mirror body, along a reflection surface of the mirror body. Thus, the radiated light is visually recognized as indirect illumination light by a driver, and for example, in a case where the light is provided for emergency warning in a warning lighting system that is indicative of the fact that a following vehicle is approaching, there is no denying that such a system is prone to lack its related visual recognition properties of light.

On the other hand, in addition to the above disclosure, there is also disclosed that a technique is employed in such a manner that the inner circumferential edge of the flange on a circumferential edge of the holder mentioned previously is partially formed so as to be increased in width toward a center of a reflection surface of a mirror body; an opening window portion is formed on a top surface of the mirror body, and at the opening window portion, the light emission surface of the light guide mentioned previously is secondarily disposed.

In this case, a driver can directly visually recognize the emitted light from the light emission surface of the light guide and thus the failure as mentioned previously does not occur; and however, the flange on a circumferential edge of the holder is partially increased in width to the center side of the reflection surface of the mirror body. Therefore, a reflection surface of the mirror body is reduced, and an effective field of view of the door mirror decreases.

SUMMARY OF THE INVENTION

The present invention provides a vehicle door mirror that has its appropriate visual recognition properties of light from a light emitting portion that is arranged at a circumferential edge portion of a reflection mirror unit, and moreover, that is capable of sufficiently ensuring an effective field of view of the door mirror.

A vehicle door mirror of the present invention, comprising:
between a circumferential edge of a mirror body of a reflection mirror unit and a flange on a circumferential edge of a holder adapted to hold the mirror body, providing a gap for light emission in which the circumferential edges thereof are formed to be partially spaced from each other in a radial direction; and
in the gap, secondarily disposing a light emitting portion of a lighting unit.

A vehicle door mirror of the present invention, comprising:
housing and arranging a circuit board that includes an optical system of a lighting unit, between a circumferential edge of the mirror body and a holder adapted to hold the mirror body,
between a circumferential edge of a mirror body of a reflection mirror unit and a flange on a circumferential edge of a holder adapted to hold the mirror body, providing a gap for light emission in which the circumferential edges thereof are formed to be partially spaced from each other in a radial direction; and
in the gap, secondarily disposing a light emitting portion of a lighting unit.

According to the present invention, a light emitting portion of a lighting unit can be arranged in the same direction as that of a reflection surface of a mirror body and thus a driver can directly visually recognize light that is emitted from the light emitting portion in the same way as when he or she visually recognizes what is going on in field of view on a back side by means of the reflection surface of the mirror body, and its related visual recognition properties of light can be improved.

In addition, a gap in which a light emitting portion is to be secondarily disposed is formed between a circumferential edge of a mirror body and a flange on a circumferential edge of a holder in a state in which the circumferential edges thereof are partially disposed to be spaced from each other in a radial direction and thus a decrease in reflection surface of the mirror body can be reduced to its required minimum level; and therefore, an effective field of view of the door mirror can be sufficiently ensured.

Further, a reflection mirror unit can be configured as the one of such a type as to incorporate a lighting unit and thus parts and components of the door mirror can be compactly arranged, and the degree of freedom of design can be enhanced.

DESCRIPTION OF THE PREFERRED EMBODIMENTS

Hereinafter, an embodiment of the present invention will be described in detail with reference to the drawings.

Figure 1:
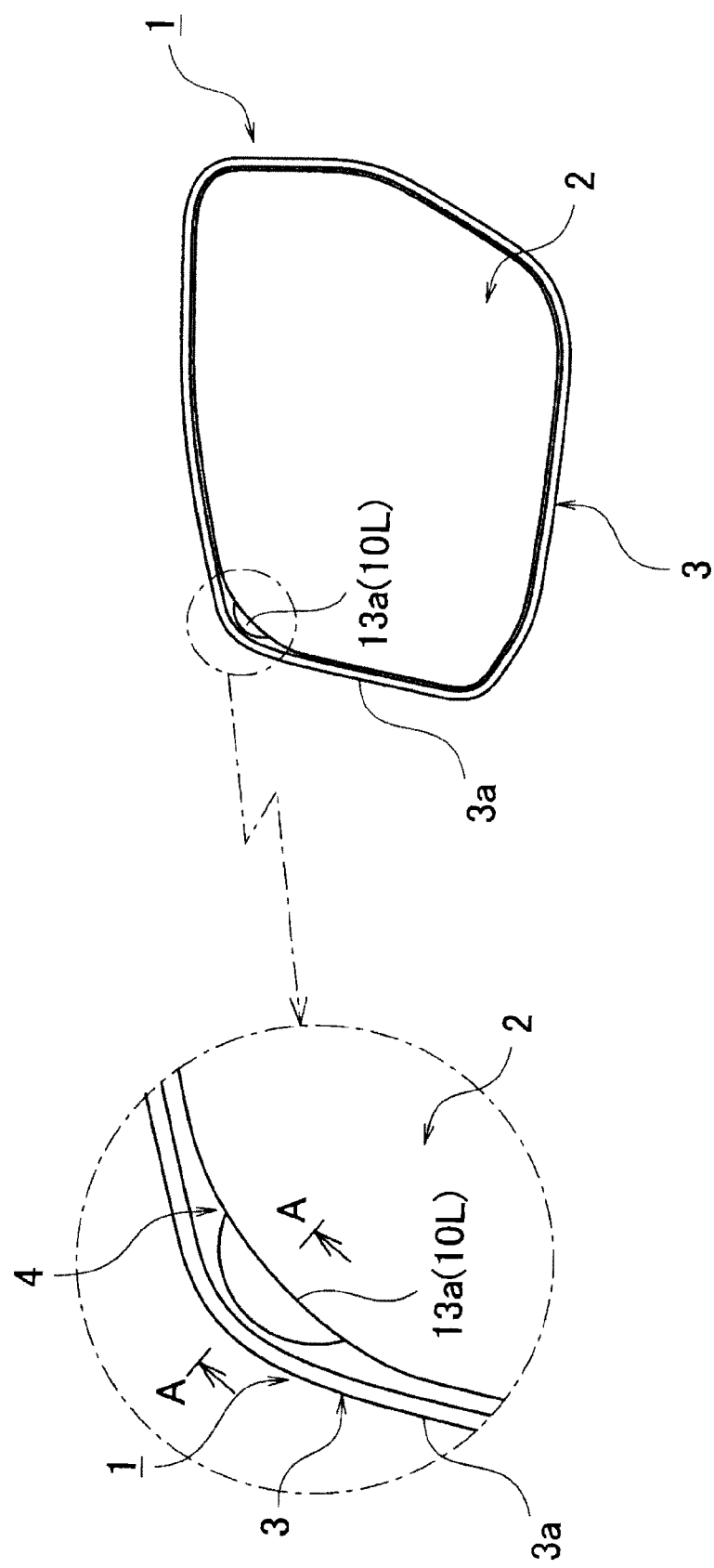
FIG. 1 is a front view showing an embodiment of a reflection mirror unit of a vehicle door mirror according to the present invention.
Figure 2:
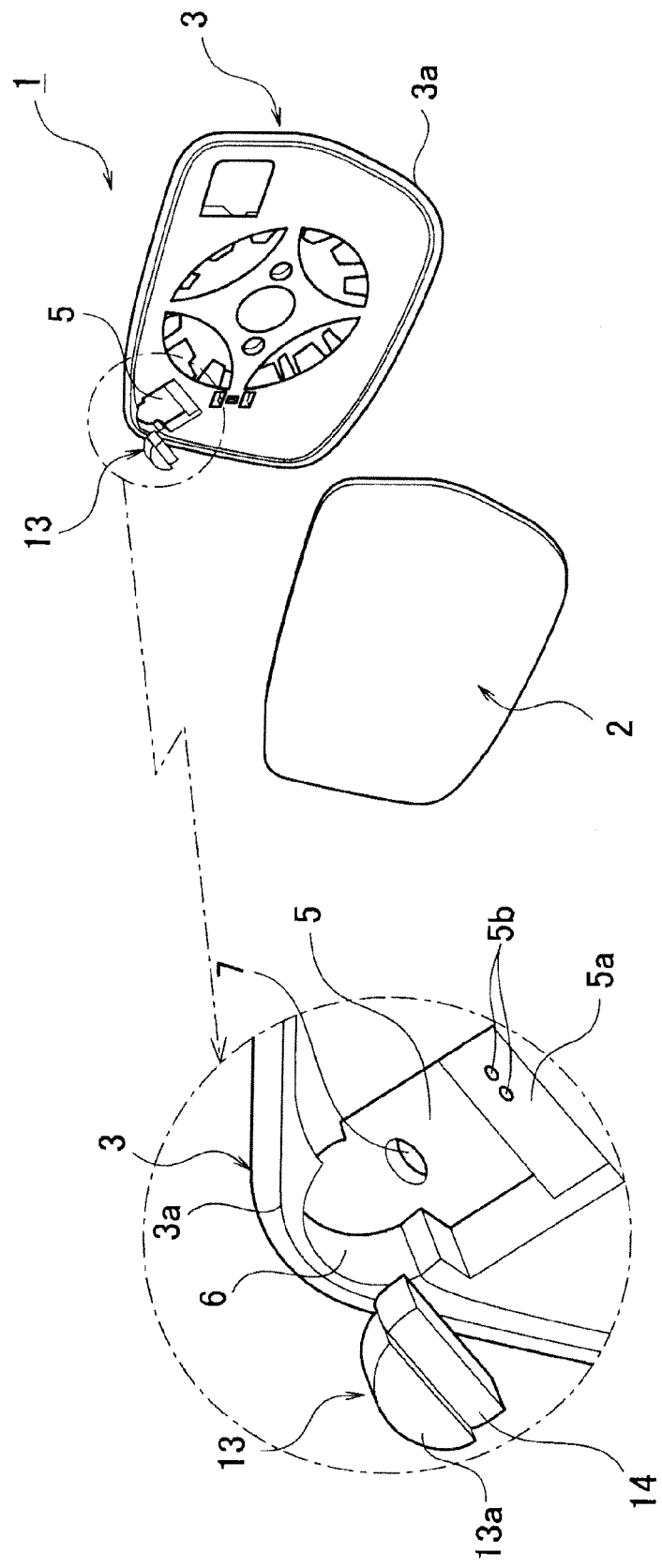
FIG. 2 is an exploded perspective view of the reflection mirror unit shown in FIG. 1.

A reflection mirror unit 1 of the embodiment, shown in FIG. 1 and FIG. 2, is provided with: a mirror body 2; and a synthetic resin-based holder 3 adapted to assemble the mirror body 2 with a mirror body actuation unit, although not shown.

Figure 3:
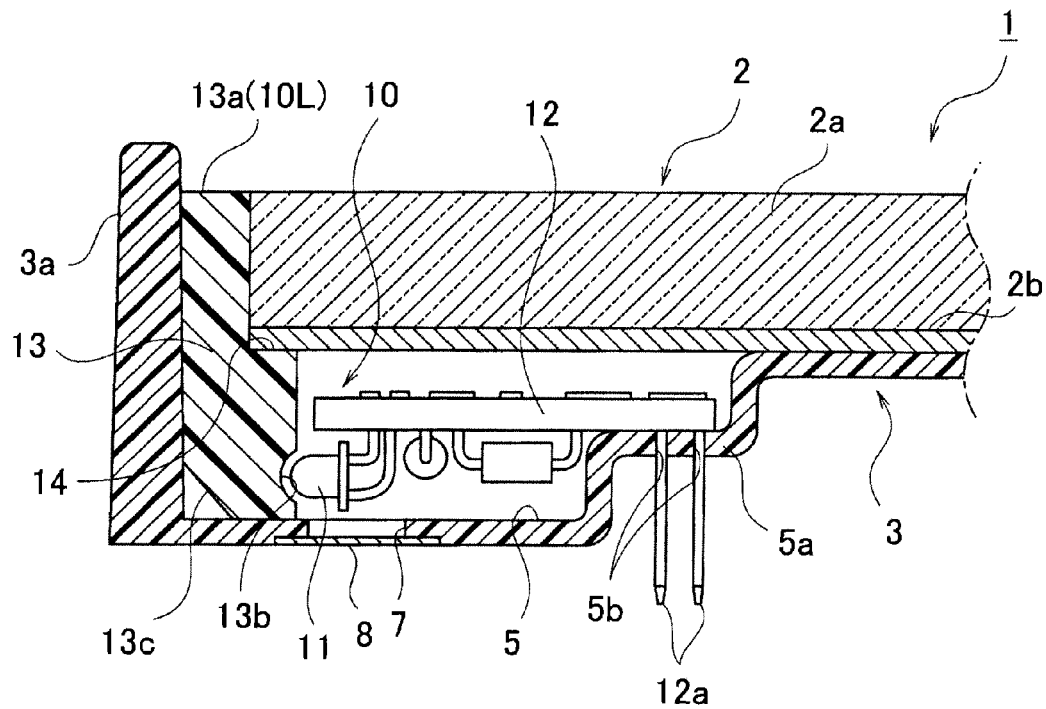
FIG. 3 is a sectional view of essential portions taken along the line A-A of FIG. 1.

In the mirror body 2, for example, on one face of a surface plate member 2a such as a transparent plate glass, a reflection film 2b is provided and configured by means of aluminum vapor deposition or chrome vapor deposition (refer to FIG. 3).

The holder 3 is configured as a plate-shaped member having a synthetic resin-based flange on a circumferential edge 3a of a size to an extent such that is capable of engaging the mirror body 2 therewith, and the holder 3 serves to envelope a surface on which the reflection film 2b of the mirror body 2 is provided and its circumferential face, and is adhesively bonded with, and is fixed to the mirror body 2 by means of an appropriate adhesive bonding member.

At a required site of the reflection mirror unit 1, for example, at a corner portion of one side top part that can be easily visually recognized by a driver, is a gap 4 for light emission is provided in such a manner that between the circumferential edge of the mirror body 2 and the flange on a circumferential edge 3a of the holder 3, the circumferential edges thereof are partially spaced and formed in a radial direction.

In the example shown in FIG. 1, a radius in a curvature of a circumferential edge of the mirror body 2 is set to be large with respect to a flange on a circumferential edge 3a of the holder 3, and the circumferential edge of the mirror body 2 is displaced more inwardly in a radial direction than the flange on a circumferential edge 3a of the holder 3, thereby providing the gap 4 mentioned previously.

In the gap 4, a light emitting portion 10L of a lighting unit 10 to be described later is secondarily disposed.

The light emitting portion 10L is formed at a maximum width portion of the gap 4 in a substantially semicircular shape so as to be taken along a curved shape of the semicircular shape.

In the embodiment, the reflection mirror unit 1 is configured as that of such a type as to incorporate a lighting unit therein, and the lighting unit 10 is housed and arranged between a back face of the mirror body 2 and the holder 3.

Specifically as shown in FIG. 3, in the holder 3, at a circumferential side proximal position corresponding to the gap 4, in other words, at a corner portion of a top of one side, a recessed portion 5 is formed in such a manner as to form a closed space with respect to the back face of the mirror 2.

In the recessed portion 5, a circuit board 12 that includes an optical system of the lighting unit 10 is arranged.

In the embodiment, the lighting unit 10 is provided with: a light source 11; a circuit board 12 adapted to control illumination of the light source 11; and a light guide 13 adapted to receive the light that is emitted from the light source 11 and then guide the received light to a light emission surface 13a.

The light source 11 is coupled with, and is fixed to, the circuit board 12, and one end part of the circuit board 12 is fixed by means of an appropriate fitting means, on a stepped portion 5a that is set inside of the recessed portion 5. At this stepped portion 5a, an electric power conducting member arrangement hole 5b is provided, and for example, as a power conducting member, a connection connector 12a on the side of the circuit board 12 is inserted via a grommet, although not shown, and appropriate sealing properties are obtained.

In addition, this connection connector 12a also serves as a connection connector to which a connector of a power supply side harness, although not shown, is connected in an electrically conductive manner. While, in the example shown in FIG. 3, the connection connector 12a is inserted to be pressed into the electric power conducting member arrangement hole 5b, it is also possible to pull out the harness on the side of the circuit board 12 through this hole and then connect it to the power supply side harness.

Further, the light source 11 is lit to thereby generate a heat and thus a ventilation hole 7 is provided at a required site of the recessed portion 5, whereby a heat radiation action can be obtained. In this ventilation hole 7, a ventilation waterproof film 8 is provided so as to thereby achieve thorough sealing.

The light guide 13 is made of an appropriate synthetic resin material having its superior internal light guiding properties. This light guide 13 has a light emission surface 13a, a light receiving surface 13b, and a reflection surface 13c; the light receiving surface 13b is disposed so as to be opposed in proximity to the light source 11; and the light emission surface 13a is secondarily disposed in the gap 4 for light emission.

In other words, in the embodiment, the light emission surface 13a of this light guide 13 configures the light emitting portion 10L mentioned previously. Therefore, the light guide 13 is die-molded separately from the holder 3 so as to be formed in a substantially semicircular shape when the light guide is seen in a cross-sectional view.

On the other hand, the recessed portion 5, as shown in FIG. 2, is provided with a groove portion 6 with which the light guide 13 can engage, and the light guide 13 is engaged with this groove portion and then is fixedly attached. In order to fixedly attach the light guide 13 to this groove portion 6, for example, there can be employed an appropriate fixed attaching means such as welding by means of a heat plate, ultrasound welding, or adhesive bonding by means of an adhesive agent or a double-sided adhesive tape.

The light guide 13 is provided with an engagingly stop stepped portion 14 that adjacent to the light emission surface 13a, the stepped portion being molded in a stepped manner so as to be lower than the light emission surface 13a in dimensions that are equivalent to a plate thickness of the mirror body 2. This engagingly stop stepped portion 14 also serves as a portion where a circumferential edge portion of the mirror body 2 is engagingly stopped, and is adhesively bonded, to be thereby able to achieve thorough sealing around a portion at which the light guide 13 is arranged, and to carry out reliable retention and fixing of the light guide 13.

According to the vehicle door mirror of the embodiment, which is made of the above constituent elements, between the circumferential edge of the mirror body 2 that configures the reflection mirror unit 1 and the flange on a circumferential edge 3a of the holder 3, a gap 4 for light emission is provided in a state in which these circumferential edge and flange are partially spaced from each other in a radial direction, and in the gap, the light emitting portion 10L of the lighting unit 10 is secondarily provided.

In this manner, the light emitting portion 10L of the lighting unit 10 can be arranged in the same direction as that of the reflection surface of the mirror body 2; and therefore, a driver can directly visually recognize the light that is emitted from the light emitting portion 10L, in a manner similar to that in which he or she visually recognizes a back side by means of the reflection surface of the mirror body 2, and its related visual recognition properties of light can be improved.

In addition, as described above, the gap 4 in which the light emitting portion 10L is to be secondarily disposed is formed between the circumferential edge of the mirror body 2 and the flange on a circumferential edge 3a of the holder 3 in a state in which these circumferential edges thereof are partially spaced from each other; and therefore, a decrease in reflection area of the mirror body 2 can be restrained to its required minimum level. In other words, the reflection surface of the mirror body 2 is not structured so as to be partially covered with the flange on a circumferential edge 3a of the holder 3; and therefore, an effective field of view of the door mirror can be sufficiently ensured.

Herein, in the embodiment, at a required site of the holder 3, a recessed portion 5 is provided in such a manner as to form a closed space with respect to a back face of the mirror body 2, and the circuit board 12 that includes an optical system of the lighting unit 10 is arranged in the recessed portion, thereby configuring the reflection mirror unit 1 of such a type as to incorporate the lighting unit.

In this manner, the parts and components of the door mirror can be compactly arranged, and the degree of freedom of design can be enhanced. In addition, by means of the recessed portion 5, a closed space is configured on a back face of the mirror body 2, thus making it possible to simplify sealing construction for waterproof and dust proof of electric or electronic parts such as the circuit board 12.

Moreover, the recessed portion 5 does not have any opening hole other than the power conducting member arrangement hole 5*b* and the ventilation hole 7, and for example, the connection connector 12*a* of the circuit boar 12 is disposed to be inserted into the power conducting member arrangement hole 5*b* via a grommet, whereas the ventilation hole 7 is closed by means of the ventilation waterproof film 8; and therefore, in the recessed portion 5, an external sealing can be thoroughly provided, and a sealing structure can be simplified.

Still furthermore, the light guide 13 adapted to guide light that is emitted from the light source 11 is employed in an optical system of the lighting unit 10, whereby the light emitting surface 13*a* is configured as the light emitting portion 10L mentioned previously.

In this manner, the light from the light source 11 can be guided at any position by means of the light guide 13, making it possible to enhance the degree of freedom in layout of arrangement of the light emitting portion 10L.

In addition, the light guide 13 is die-molded in blocks having the light emission surface 13*a*, the light receiving surface 13*b*, and the reflection surface 13*c*, in such a manner as to be separated from the holder 3, and this light guide is engaged with the groove portion 6 that is provided in the recessed portion 5, and is fixed by means of welding or adhesive bonding.

In this manner, the light guide 13 can be easily positioned when the light guide is assembled with the holder 3, making it possible to enhance its related assembling precision.

Moreover, this light guide 13 is provided with an engagingly stop stepped portion 14 that is adjacent to the light emission surface 13*a*, and the circumferential edge portion of the mirror body 2 is engagingly stopped, and is adhesively bonded, in the stepped portion, thus making it possible to provide thorough sealing around the portion at which the light guide 13 is arranged, and to carry out reliable retaining and fixing of the light guide 13.

While in the embodiment, the light guide 13 is molded in such a manner as to be separated from the holder 3, the light guide 13 can be integrally molded with the holder 3 by means of two color molding (double molding), and the light emitting portion 10L can be set with its higher precision.

It is to be noted that the light guide 13 is shown by way of example, as the one to be die-molded in blocks separately from the holder 3, whereas an optical fiber can be employed instead of such a light guide.

In addition, while a structure in which the light emitting portion 10L is constructed with the light emission surface 13*a* of the light guide 13 is shown by way of example, the light source 11 is directly arranged in the gap 4 in place of employing the light guide 13 in an optical system, whereby the light source 11 itself can be employed as the light emitting portion 10L in place of such a light guide.

Further, while in the embodiment, the reflection mirror unit 1 is shown by way of example as the one of such a type as to incorporate a lighting unit in which the circuit board 12 that includes an optical system is housed and arranged in a closed space that is formed of the back face of the mirror body 2 and the recessed portion 5 that is provided in the holder 3, the lighting unit 10 is configured so as to be separated from the reflection mirror unit 1, whereby the lighting unit is configured with a light guiding means so as to guide light to the light emitting portion 10L that is disposed so as to be adjacent to the gap 4.

In this structure of the first embodiment, as shown in FIG. 3, the holder 3 is adapted to have the recessed portion 5 for housing and arranging the lighting unit 10 and thus the mirror body 2 is adapted to have a non-adhesive area at a portion that corresponds to the recessed portion 5.

Figure 4:
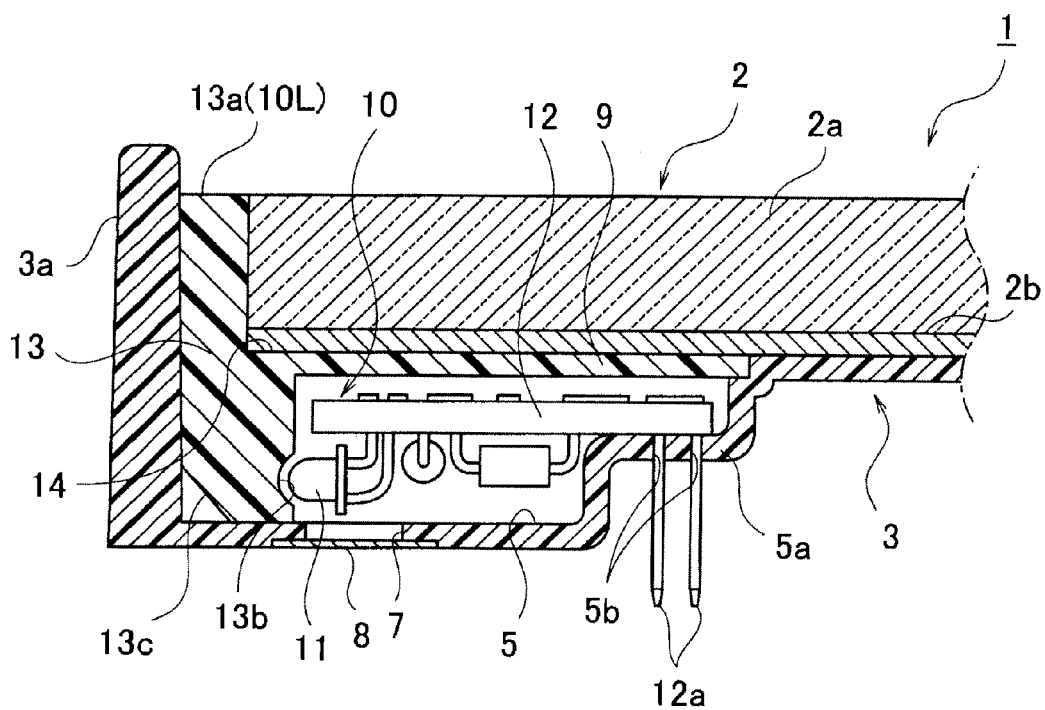
FIG. 4 is a sectional view that is similar to that of FIG. 3, showing a second embodiment of the present invention.

Therefore, in a second embodiment shown in FIG. 4, an opening of the recessed portion 5 is closed by means of a cap 9, and the mirror body 2 is adhesively bonded with, and is fixed to, an appropriate portion in such a manner as to cover the cap 9 and a general portion of the holder 3 therewith (a flat portion at which no recessed portion 5 is provided).

In the embodiment, the cap 9 is integrally molded with a block-shaped light guide 13 that is molded separately from the holder 3.

Accordingly, according to the construction of the second embodiment, a decrease in adhesive bonding area between the mirror body 2 and the holder 3 by the presence of the recessed portion 5 of the holder 3 can be compensated for by means of the cap 9, and the quality of adhesive bonding between the mirror body 2 and the holder 3 can be enhanced.

In addition, the cap 9 is integrally molded with the light guide 13, whereby the opening of the recessed portion 5 can be closed by means of the cap 9 at the same time as when the light guide 13 is assembled with the recessed portion 5, and there is no need to worry about an increase in production costs for arrangement of the cap 9.

The arrangement and construction of the cap 9 is not limited to the embodiment, and of course, it is also possible to mold the cap 9 separately from the light guide 13, and to close and arrange the opening of the recessed portion 5.

For example, as described previously, in a case where the block-shaped light guide 13 is integrally molded with the holder 3 by means of two color molding, or alternatively, in a case where an optical fiber is employed as the light guide 13, the cap 9 is used separately, and is arranged in a state in which the opening of the recessed portion 5 is covered therewith.

In this case, the cap 9 is fixedly attached to the circumferential edge of the opening of the recessed portion 5; and however, there can be selectively employed a welding means that includes vibration welding, ultrasound welding, laser welding, or heat plate welding; or an adhesive means by adhesive agent, hot melt, or double-sided adhesive tape; or alternatively, a fixedly attaching means such as an engagement means employing a rubber sealing ring.

What is claimed is:

1. A vehicle door mirror comprising:
   a reflection mirror unit, comprising:
   a mirror body having a circumferential edge;
   a holder having a flange on a circumferential edge of the holder, and holding the mirror body, the circumferential edge of the mirror body being partially spaced from the circumferential edge of the holder in a radial direction such that a gap for light emission exists between the circumferential edges; and
   a circuit board having a light emitting unit with a light emitting portion, the light emitting portion disposed in the gap, wherein the light emitting portion has a light emission surface parallel to a reflection surface of the mirror body such that light is emitted from the light emission surface in a direction perpendicular to the reflection surface of the mirror body and perpendicular to the radial direction, wherein the holder comprises a recessed portion forming a closed space with respect to a back face of the mirror body, the recessed portion disposed at a circumferential side proximal position that corresponds to the gap, the circuit board arranged in the recessed portion, wherein an opening of the recessed portion is closed by means of a cap, and the mirror body is adhesively bonded and fixed over the cap and a general portion of the holder.

2. The vehicle door mirror according to claim 1, wherein the circuit board comprises an optical system of the lighting unit which has a light source and a light guide adapted to receive light that is emitted from the light source and then guide the received light to the light emission surface.

3. The vehicle door mirror according to claim 2, wherein the cap is integrally molded with the light guide.

4. The vehicle door mirror according to claim 1, wherein
the recessed portion does not have an opening hole other than a power conducting member arrangement hole and a ventilation hole, and
the ventilation hole is closed by means of a ventilation waterproof film.

5. The vehicle door mirror according to claim 2, wherein the light guide is molded separately from the holder, whereas the recessed portion of the holder comprises a groove portion with which the light guide is capable of engaging, and the light guide is engaged with the groove portion, and is fixed by means of welding or adhesive bonding.

6. The vehicle door mirror according to claim 5, wherein the light guide comprises an engagingly stop stepped portion that is adjacent to the light emission surface, the stepped portion being molded in a stepped manner to be lower than the light emission surface, the stepped portion being adapted to engagingly stop at a circumferential edge portion of the mirror body.

7. The vehicle door mirror according to claim 2 wherein the light guide is integrally molded with the holder by means of two color molding.

* * * * *